Dec. 24, 1940.   H. McINTYRE   2,225,788
INJECTOR PUMP FOR DIESEL INTERNAL COMBUSTION ENGINES
Original Filed April 6, 1937    4 Sheets-Sheet 1

INVENTOR
H. McINTYRE
BY
ATTORNEYS.

Dec. 24, 1940.   H. McINTYRE   2,225,788
INJECTOR PUMP FOR DIESEL INTERNAL COMBUSTION ENGINES
Original Filed April 6, 1937   4 Sheets-Sheet 2

INVENTOR.
H. McINTYRE
BY
ATTORNEYS.

Dec. 24, 1940.  H. McINTYRE  2,225,788
INJECTOR PUMP FOR DIESEL INTERNAL COMBUSTION ENGINES
Original Filed April 6, 1937  4 Sheets-Sheet 3
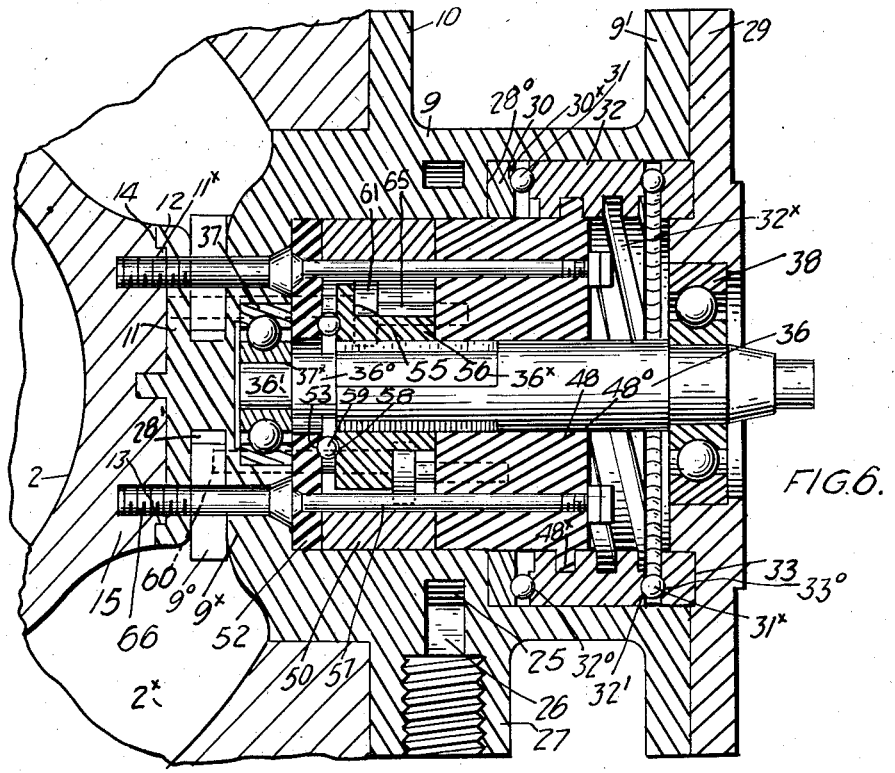
FIG.6.
FIG.13.
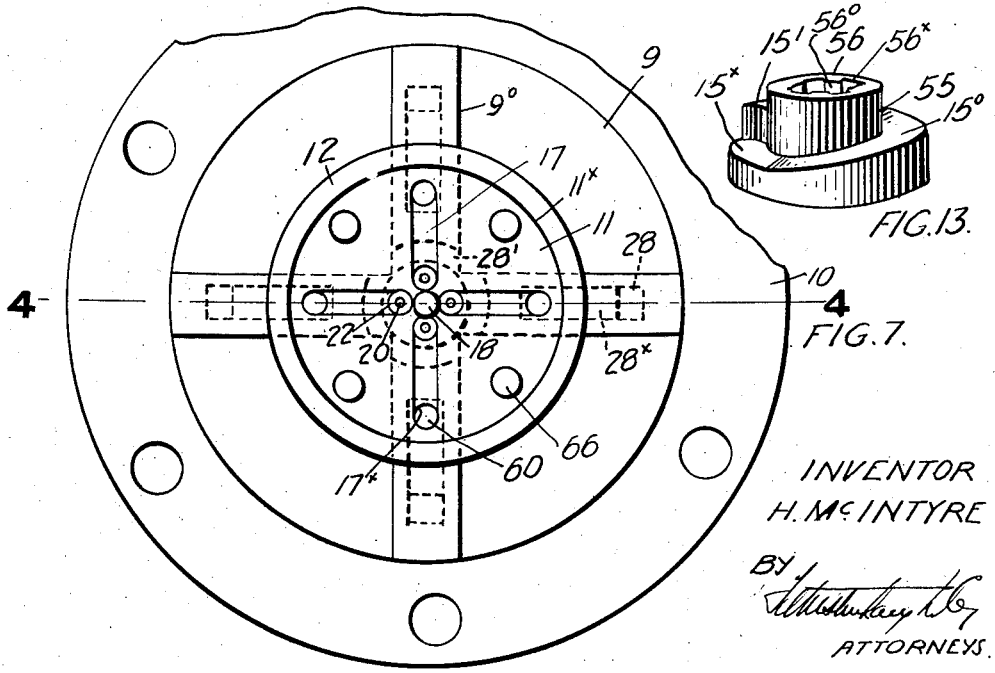
FIG.7.
INVENTOR
H. McINTYRE
BY
ATTORNEYS

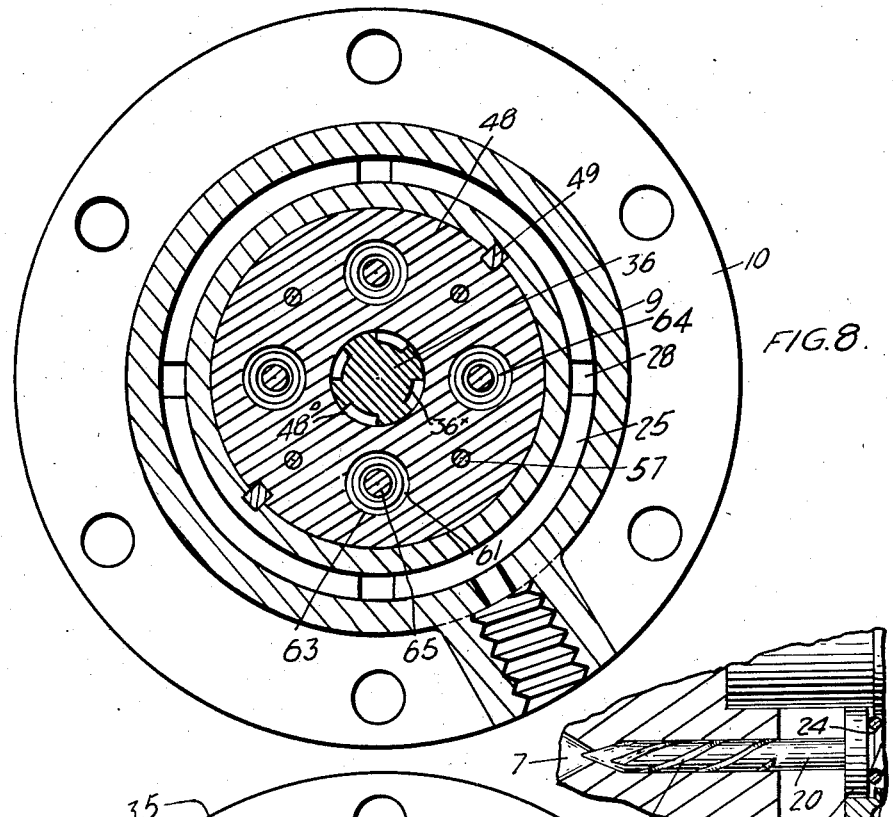
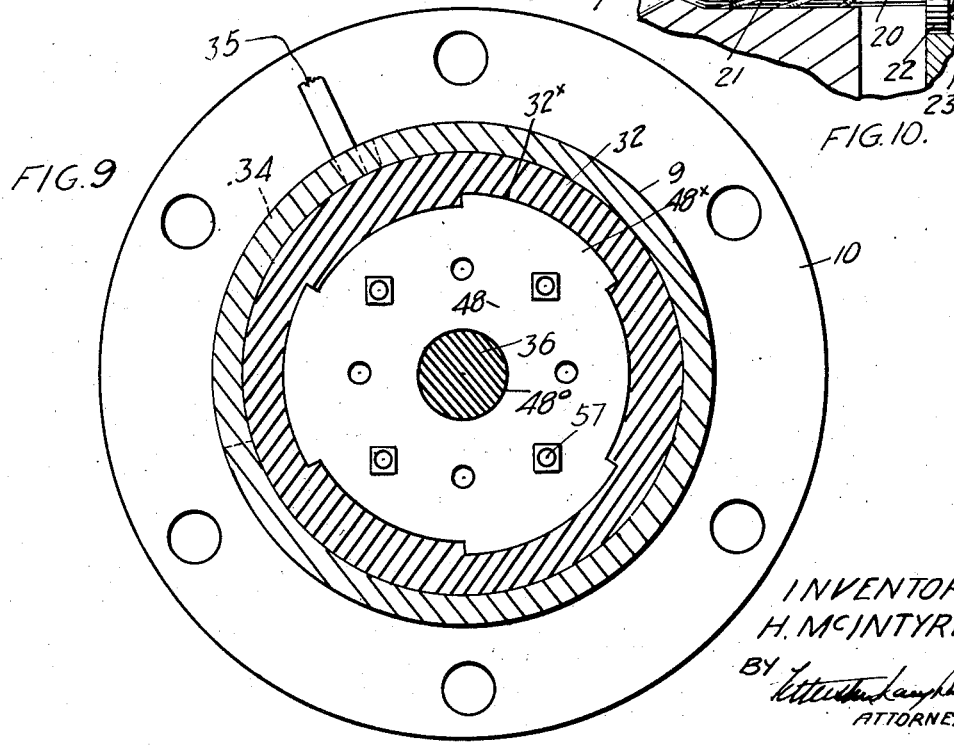

Patented Dec. 24, 1940

2,225,788

UNITED STATES PATENT OFFICE 2,225,788

INJECTOR PUMP FOR DIESEL INTERNAL COMBUSTION ENGINES

Hugh McIntyre, Kirkland Lake, Ontario, Canada

Application April 6, 1937, Serial No. 135,298
Renewed December 28, 1939

2 Claims. (Cl. 103—173)

My invention relates to improvements in injectors for Diesel internal combustion engines, and the object of the invention is to devise an injector which will be entirely self-contained providing for the pumping, injecting and atomising operation of the fuel, in which, while the engine is stopped, no fuel remains under pressure to leak into the cylinder, in which minute adjustments of the injection time to correspond with the time of the engine is provided, in which very high speed injections may be made without being run at unusually high speeds itself, in which the amount of injection is absolutely under control while the engine is running so that injections may be cut down to zero or raised above the possible point of consumption by the simple operation of a lever.

This injector has been designed especially to suit my design of a rotary internal combustion engine which is a companion application for patent but the general design with suitable adjustments for driving connections is equally adaptable to any type of Diesel internal combustion engine. My invention consists essentially of the arrangement and construction of parts all as hereinafter more particularly explained.

Fig. 6 is a sectional view on line 6—6 Fig. 5.

Fig. 7 is a view of the injector looking at the inner end thereof in the direction of arrow (see Fig. 4).

Fig. 8 is a sectional view on line 8—8 Fig. 4.

Fig. 9 is a sectional view on line 9—9 Fig. 4.

Fig. 10 is a fragmentary detail showing one of the needle valves for making the injections.

Fig. 13 is a detail perspective view of the main operating cam.

In the drawings like letters of reference indicate corresponding parts in the different views.

Figure 1:
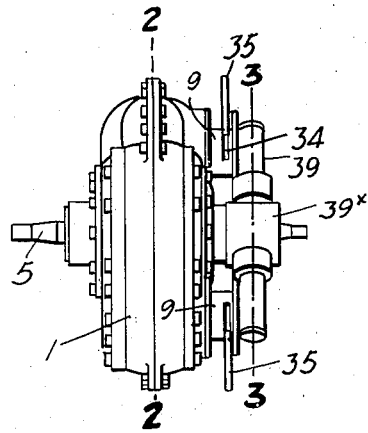
Fig. 1 is a view in elevation of one type of Diesel engine to which my injector is applied.

1 indicates a rotary engine provided with an annular cylinder 2 in which operate pistons 3 and 4 arranged in pairs. 5 is the main shaft of the engine. 6 are the exhaust ports and 7 are the inlet ports through which the fuel is injected between the pistons 3 and 4.

In the case where the device is applied to a Diesel engine, air is compressed into the space between the pistons 3 and 4 at a point opposite the injection orifices 7 so that when the injection is made the heat generated by the compression of the air fires the charge in accordance with the usual practice in Diesel operated engines.

8 is an orifice which is formed in the walls $1^x$ forming the water jackets of the engine opposite each group of injection orifices 7. 9 is the main casing of the injector which is cylindrical in form fitting within the orifice 8 and provided with an annular flange 10 which is secured by bolts or other means to the wall of the engine. The casing is provided with a bottom wall $9^x$ at its inner end and integral with this bottom wall are formed radial ribs $9^o$. 11 is a circular plate portion formed integral with the ribs $9^o$ and recessed at $11^x$ to form a surrounding wall 12 fitting a correspondingly grooved portion 14 formed in the boss 15 formed integral with the wall of the cylinder 2. The base of the recess $11^x$ is formed by a wall 16 in which are formed radial grooves 17 extending outwardly from a central projection 18 which forms a centering member fitting into a correspondingly formed recess 19 in the centre of the boss 15.

Figure 4:
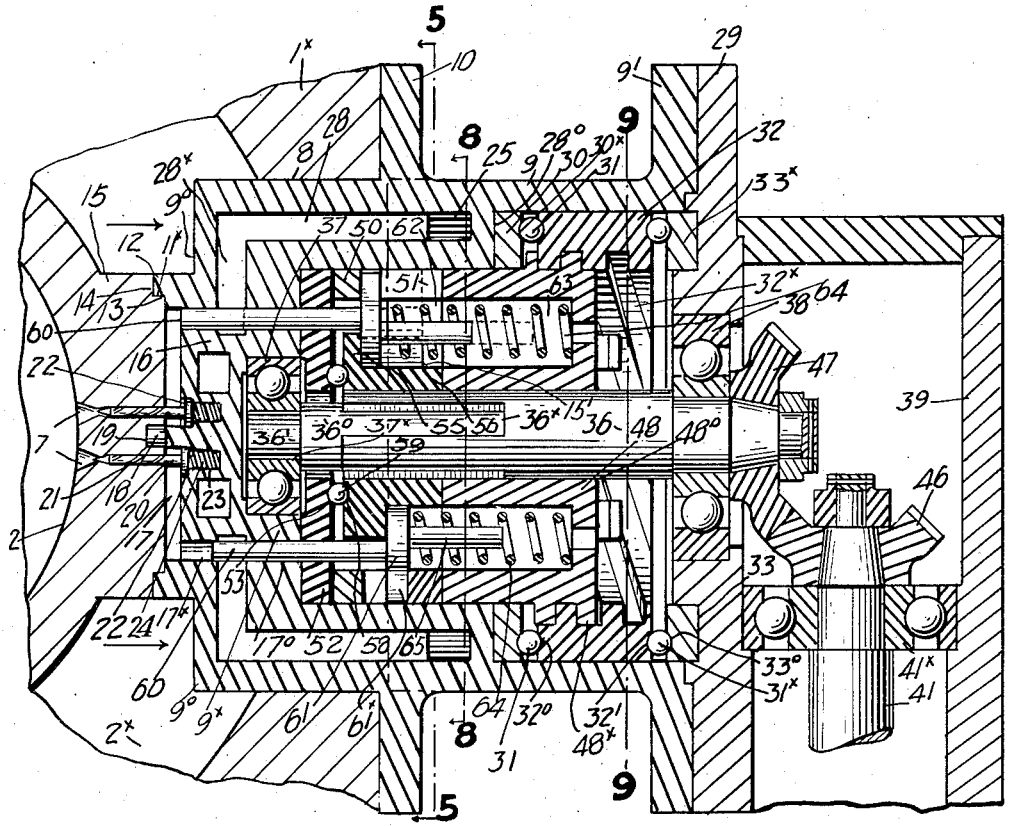
Fig. 4 is an enlarged sectional view through the injector and adjacent parts of the rotary engine and on line 4—4 Fig. 7.
Figure 5:
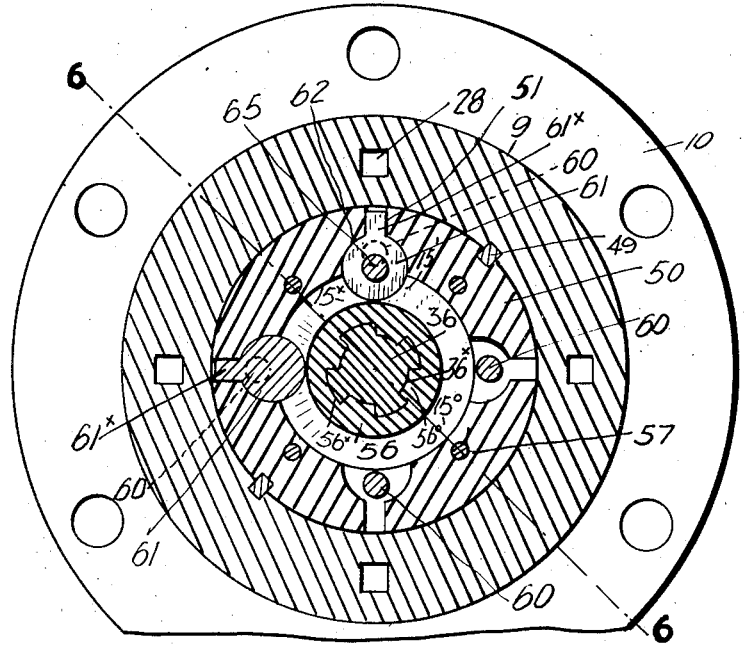
Fig. 5 is a sectional view on line 5—5 Fig. 4.

The inner ends of the injection orifices 7 are flared outwardly as clearly indicated in Fig. 4. 20 are needle valves. A needle valve 20 fits into each orifice 7 and is provided in its exterior periphery with spiral grooves 21 through which oil is forced as will hereinafter appear. The inner ends of the needle valves 20 are provided with heads 22, each head extending into a groove 17 formed in the wall $9^x$. 23 is a recess in which fits a compression spring 24 bearing against the head 22 of the needle valve 20. In the wall of the casing 9 is formed intermediately of its length an annular oil supply duct 25 into which oil is fed through the orifice 26 and boss 27 to which a suitable oil supply pipe is connected.

At the opposite or outer end of each groove 17 is formed an orifice $17^x$ in longitudinal alignment with an orifice $17^o$ leading to the inner face of the wall $9^x$ of the casing 9. 28 are ducts extending longitudinally in an inward direction through the casing wall 9 from the annular oil supply duct 25. The inner end of each duct 28 extends radially inwardly as indicated at $28^x$ to a point intermediately between the adjacent ends of the orifices $17^x$ and $17^o$. The outer end of the casing 9 is provided with an annular flange 9' to which is secured a closure head 29. It will be noted on referring to Fig. 4 that an annular internal shoulder 28° is formed in the wall of the casing immediately above the annular duct 25.

30 is an annular ring resting upon the annular shoulder 28° and provided with a groove 30ˣ forming a ball race in which the ball bearings 31 operate. 32 is a sleeve like member which also fits into the casing 9 and is turnable therein and is provided with internal threads 32ˣ. The opposite ends of the sleeve 32 are provided with annular grooves 32° and 32' in which the balls 31 and 31ˣ operate.

33 is an annular groove formed in the closure head 29 and in which is secured a ring 33ˣ provided with an annular groove 33° in which the balls 31ˣ operate. 34 is an arch shaped slot formed in each casing 9. 35 is an operating lever extending through such slot and secured to the sleeve member 32. By this means the sleeve member may be adjusted circumferentially for a purpose which will hereinafter appear.

36 is the main shaft of the injector mounted at its inner end in bearings 37 and at its outer end in bearings 38. The intermediate portion of the main shaft 36 is provided with longitudinal grooves 36ˣ, the inner end of the shaft being reduced at 36° to a diameter equal to the base of the grooves 36ˣ and further reduced at 36' to be secured in the orifice 37ˣ formed in the inner member of the ball bearing 37. 39 is a gear casing which is secured to the cover members 29 and extending diametrically of the engine 1, the central portion of such gear casing being enlarged as indicated at 39ˣ.

Figures 3, 11, 12:
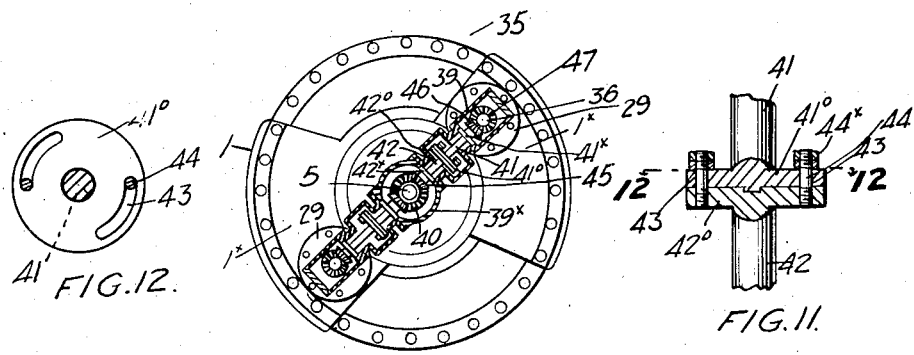
Fig. 3 is a sectional view on line 3—3 Fig. 1.
Fig. 11 is a detail partially in section showing means for adjusting the timing.
Fig. 12 is a sectional view on line 12—12 Fig. 11.
Figure 2:
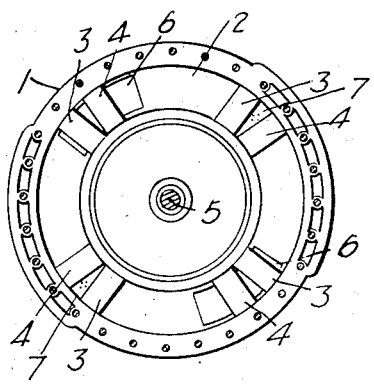
Fig. 2 is a sectional view on line 2—2 Fig. 1.

40 is a bevelled gear secured to the main shaft 5 of the engine. 41 and 42 are members of a divided shaft which extend radially and are mounted in bearings 41ˣ and 42ˣ. The inner adjacent ends of the shaft members 41 and 42 are provided with annular flanges 41° and 42° which are illustrated in detail in Figs. 11 and 12. One of the annular flanges 41° or 42° is provided with arc shaped slots 43 through which bolts 44 secured in the opposing flange pass to be secured by nuts 44ˣ. By this means one member of the divided shaft may be turned in relation to the other to alter the timing of the injector as will hereinafter appear.

The inner end of the shaft member 42 is provided with a bevelled gear 45 meshing with the bevelled gear 40 of the engine shaft. The outer end of the shaft member 41 is provided with a bevelled gear 46 meshing with the bevelled gear 47 secured to the main shaft 36 of the injector. By this means the main shaft 36 of the injector is driven from the main shaft of the engine.

48 is a cylindrical member provided with an external thread 48ˣ meshing with the thread 32ˣ of the turnable member 32. 50 is a cylindrical member of the same diameter as the member 48 and is provided with longitudinal slots 51 for a purpose which will hereinafter appear. The members 48 and 50 are held from rotation by means of the feather keys 49 which permit of the longitudinal movement of such members.

52 is a circular plate which fits the interior of the casing 9 against the inner face of the bottom wall 16 thereof. The plate 52 is provided with an annular groove 53 forming a ball race. 55 is the main cam of my device illustrated in detail in Fig. 13. The face of the cam 55 is formed by a flat portion 15ˣ and a spiral portion 15° extending upwardly to a shoulder 15' which is curved for a purpose which will hereinafter appear.

The member 48 is provided with a central orifice 48° through which the main shaft 36 of the injector extends. The central sleeve portion 56 of the cam 15 is provided with a central orifice 56ˣ which is ribbed as indicated at 56° to slidably fit the grooves 36ˣ of the main shaft 36. The members 48 and 50 and the plate 52 are secured together by means of the bolts 57 so that these parts are moved longitudinally in unison. The lower face of the cam 15 is provided with an annular groove 58 opposing the annular groove 53 and in which the balls 59 operate to hold the cam member 15 and plate 52 spaced apart so that the cam member 15 rotates freely in relation to the plate and yet permits of the longitudinal movement of the cam member 15 upon the main shaft 36.

60 are plunger rods operating within the orifices 17ˣ and 17° for creating oil pressure in the grooves 17. The outer ends of the plunger rods 60 are provided with concentric discs 61 provided with tongues 61ˣ extending into the slots 51. 62 and 63 are longitudinally aligned orifices formed in the members 48 and 50 and in which are contained compression springs 64. 65 is a pin projection extending from the disc 61 centrally into the compression spring 64.

The shoulder 15' hereinbefore referred to is curved concentrically to the discs 61 so that as the discs ride up the spiral portion 15° of the cam face they drop off the shoulder 15' exactly at the required time. 66 are screws extending through the wall 16 of the injector casing 9 into the boss 15 to secure the injector in place. 2ˣ is a water space extending around the engine cylinder. As it will be noted in Figs. 6 and 7 the radial portions 28ˣ of the ducts 28 are formed in rib like portions 9° extending between the central portion of the casing 9 and the wall of the orifice 8 in which the casing 9 is secured. Adjacent the inner end of these bosses is formed an orifice 28' so that the water contained in the water space 2ˣ passes through such orifices to circulate around the needle valves 20 and keep this part of the injector cool.

Having described the principle parts involved in my invention I will briefly describe the operation of the same.

As before stated the main shaft 36 of the injector is rotated from the main shaft 5 of the engine through the gears 40 and 45, divided shaft members 42 and 41 and gear 46 meshing with the gear 47 of the injector shaft 36. The rotation of the injector shaft rotates the cam 55 so as to successively reciprocate the plungers 60 successively withdrawing the inner end of such plungers from the orifice 17ˣ so as to permit the entrance of oil into the corresponding grooves 17 formed between the inner end of the casing 9 and the boss 15 of the engine.

When the disc portion 61 drops off the shoulder 15' from the dotted position shown in Fig. 4, the plunger 60 is driven inwardly by the springs 64 so as to force oil through the orifices 17ˣ and create a pressure in the corresponding groove 17. This pressure is transmitted to the head 22 of a corresponding needle valve 20 so as to lift the same against the pressure of the spring 24. By this means the adjacent ends of the spiral grooves 21 are carried out of the orifices 7 so as to allow the oil to pass into such grooves and the oil is thereby given a spiral movement so that as it passes under pressure into the flared end 7 of the injector orifices it spreads outwardly and, at the same time, is given a swirling action which atomizes the oil so as to thoroughly mix with the air which has been compressed in the space between the pistons 3 and 4. The charge so injected into the air is then fired by the heat of the compressed air if it is used in a Diesel type of engine or by a spark from an igniter if the engine is of ordinary combustion type.

It is pointed out that the same type of injector as described can be used on any Diesel type of engine and it is particularly pointed out that it has been designed to provide a high speed injection without running the injector at high speed. Although the injector described above is particularly adapted for use in a rotary Diesel engine set forth in a copending application Serial No. 123,354, filed February 1st, 1937, and which has matured as U. S. Patent No. 2,126,795 it may, of course, be applied to any engine, there being one injector for each cylinder, the drive to the injectors being carried out by one drive shaft linked to the crank shaft of the engine.

In order to control the amount of injection, all it is necessary to do is to operate the handle 35 to turn the internally threaded member 32 within the casing 9 and thereby move the members 48 and 50 and the plate 52 and cam member 15 longitudinally, the cam member carrying therewith the plungers 60 thereby controlling the length of movement of the plunger in the orifice 17$^x$ when released by the cam 15 to inject more or less fuel into the engine cylinder.

In the model being made the springs 64 are to have a pressure of not less than 16 pounds on the discs 61$^x$. A pressure of 16 pounds concentrated on the plunger ($\frac{1}{8}$" dia.) equals a pressure per square inch of 1333 pounds and this pressure is transmitted to the fuel in 17$^x$. This pressure has a lifting effect on the head of the needle valve 22 (dia. of valve stem $\frac{1}{4}$" and of head 22$\frac{1}{8}$") equal to 14½ pounds. The size of the orifice at the point of the needle valve 20 is $\frac{1}{32}$" diameter, so that a spring 24 would only have to exert a pressure of 6½ ounces on the needle head 22 to overcome the pressure of 450 pounds per square inch within the cylinder. It will be seen, therefore, that the pressure exerted on the head 22 of the needle valve 20 by the action of the plunger 60 is equal to 14½ pounds, while the spring 24 exerts a contra pressure of only 6½ ounces. As this head is the only movable thing in connection with the groove 17 and as the pressure is exerted only on the one side of the head 22 owing to its position in the closely fitting recess 22$^x$, it is quite obvious that the needle head will be forced into the recess 22$^x$ against the shoulder at the recess 23, thus opening the spiral grooves for the escape of the fuel under pressure.

What I claim as my invention is:

1. In a fuel injector, an injector body, a base for the body having a plurality of discharge orifices therein, a fuel supply duct leading to each orifice, a crown cam shaft mounted in the injector and having longitudinal grooves therein, a crown cam slidably mounted on the shaft and engaging the grooves, a cam carrier through which the shaft freely extends, means for adjusting the carrier longitudinally of the shaft, spring pressed plungers mounted in the carrier and adapted to enter the fuel ducts to exert pressure on the fuel and projections extending laterally from the plungers and resting on the operating face of the cam, and a shoulder formed in the cam face off which each plunger projection drops at a point for exerting pressure in each fuel duct.

2. In a fuel injector, an injector body, a plurality of fuel supply ducts leading to the base of the body, a crown cam shaft mounted in the body and having longitudinal grooves therein, a crown cam slidably mounted on the shaft and engaging the grooves, a cam carrier through which the shaft freely extends, means for adjusting the carrier longitudinally of the shaft, spring pressed plungers mounted in the carrier and adapted to enter the fuel ducts to exert pressure on the fuel, means coacting with the face of the cam for imparting longitudinal movement to the plungers against such spring pressure, and means for suddenly releasing each plunger as it reaches a predetermined point in the cam face.

HUGH McINTYRE.